J. G. CHERRY.
Milk-Pan.
No. 219,910. Patented Sept. 23, 1879.
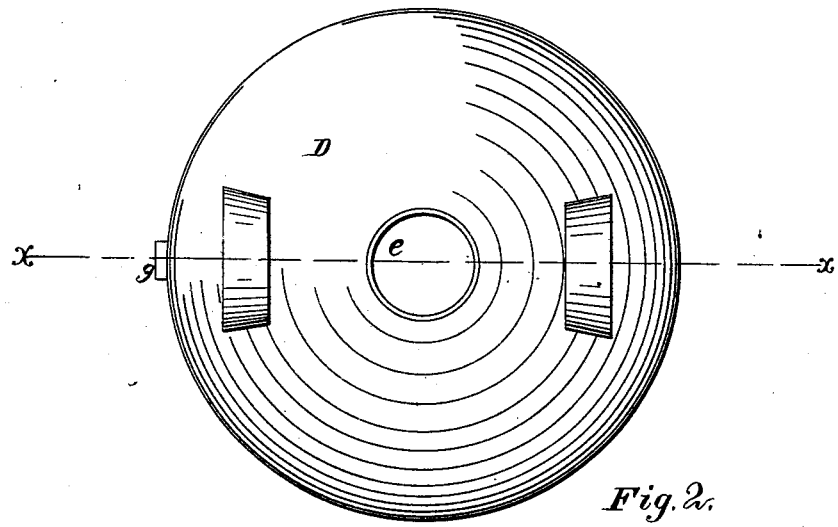
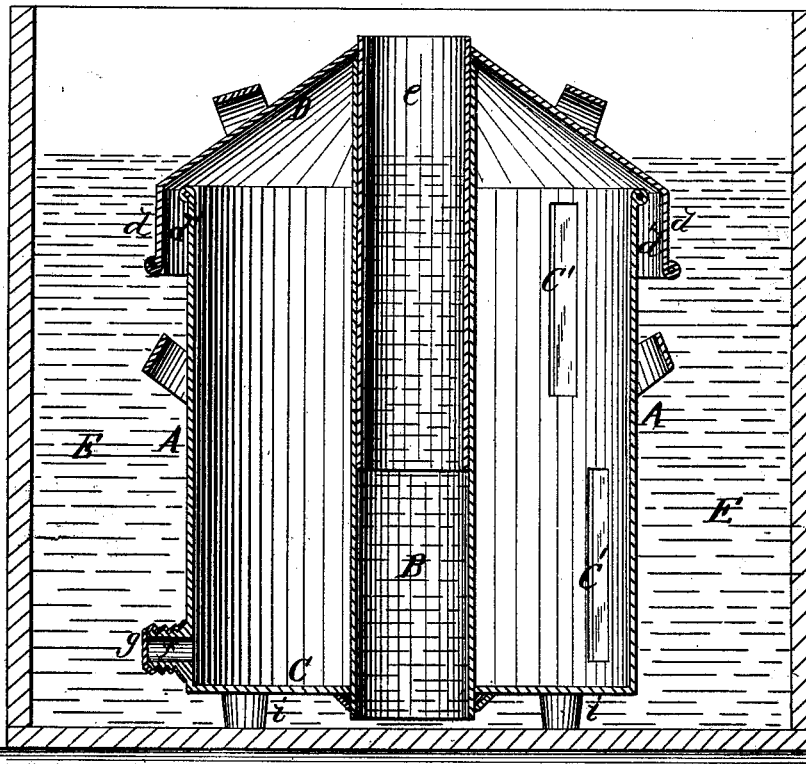

UNITED STATES PATENT OFFICE.

JOHN G. CHERRY, OF WALKER, IOWA.

IMPROVEMENT IN MILK-PANS.

Specification forming part of Letters Patent No. 219,910, dated September 23, 1879; application filed June 7, 1879.

*To all whom it may concern:*

Be it known that I, JOHN G. CHERRY, of Walker, in the county of Linn and State of Iowa, have invented a new and Improved Milk-Pan, of which the following is a specification.

The object of the invention is to have a submerged milk-pan that will cool the milk and raise the cream in the shortest and best possible manner.

It consists of a pan adapted to be submerged in a vat of water, and provided with a cooling-tube for cooling the milk from the center as well as from outside of pan; also, of other details of construction fully referred to farther on, and specifically pointed out in claim.

In the accompanying drawings, Figure 1 is a top plan of the improvement, and Fig. 2 is a vertical section of the pan on line $xx$ of Fig. 1 and of the vat in which it is intended to be placed.

Similar letters of reference indicate corresponding parts.

Referring to the drawings, A represents the shell of the pan, in the center whereof is a tube, B, opening through the bottom C and projecting above the top of the shell. In the sides of the shell are windows $C'$ $C'$, graduated, the object whereof is to permit the milk or cream to be seen and to be measured in the pan.

D is the top. The ring portion $d$ is larger in diameter than the shell, and, fitting loosely over it, leaves a space, $d'$, between. The conical portion of the top is connected with a central open downward-projecting tube, $e$, which fits inside of the tube B, running downward within two or three inches of the bottom of pan, the top of the cover D resting on tube B, making it air-tight.

At the bottom of the shell of the pan is an outlet, $f$, for drawing off the milk and cream, which is closed by a screw-cap, $g$. This pan is set in a vat of water, E, and is held to its place by a slat running across vat and over top of pan.

The space $d'$ between the top and shell is an air-chamber, and when the pan is submerged this space is filled with air, and prevents the water from entering into pan.

After the pan is submerged the water surrounds the shell, and also rises in the tube B, thus cooling the milk from the exterior and interior.

The vapor or animal heat arising from the milk condenses on the conical top, and, trickling down its sides, enters the water in the vat.

The pan, it will be observed, is provided with feet $i$ for sustaining the bottom above the bottom of the vat.

Having thus fully described my invention, I claim as new and desire to secure by Letters Patent—

As an improvement in milk-pans, the shell A, provided with graduated windows $C'$ $C'$ and central tube B, in combination with conical top D, having the ring portion larger than the shell, so as to leave a space, $d'$, when placed over it, and provided with a tube, $e$, for connecting with and to be inserted in tube B, whereby the pan is adapted to be submerged in the vat E, allowing the milk to be cooled from both exterior and interior, also permitting the animal heat or vapor to pass from the milk into the water, and at the same time sealed from the admission of water to its interior, substantially as described.

JOHN G. CHERRY.

Witnesses:
E. J. SALMON,
L. PARKHURST.